US009610578B2

(12) United States Patent
Mershin et al.

(10) Patent No.: US 9,610,578 B2
(45) Date of Patent: Apr. 4, 2017

(54) METHODS AND APPARATUS FOR MICROFLUIDIC PERFUSION

(71) Applicant: Massachusetts Institute of Technology, Cambridge, MA (US)

(72) Inventors: Andreas Mershin, Cambridge, MA (US); Alexander Leffell, New Haven, CT (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/158,644

(22) Filed: May 19, 2016

(65) Prior Publication Data

US 2016/0339429 A1 Nov. 24, 2016

Related U.S. Application Data

(60) Provisional application No. 62/164,072, filed on May 20, 2015.

(51) Int. Cl.

*B01L 3/00* (2006.01)
*B01L 9/00* (2006.01)
*F16L 9/00* (2006.01)

(52) U.S. Cl.

CPC ........... *B01L 3/502715* (2013.01); *B01L 9/00* (2013.01); *B01L 9/52* (2013.01); *B01L 9/527* (2013.01); *B01L 2200/025* (2013.01); *B01L 2200/026* (2013.01); *B01L 2200/027* (2013.01); *B01L 2300/0645* (2013.01); *B01L 2300/0861* (2013.01)

(58) Field of Classification Search

CPC ....... B01L 2200/025; B01L 2300/0609; B01L 3/502715; B01L 9/00; B01L 9/52; B01L 2200/026; B01L 2200/027; B01L 2300/0861

See application file for complete search history.

(56) References Cited

U.S. PATENT DOCUMENTS

| | | | | |
|---|---|---|---|---|
| 5,890,745 | A | 4/1999 | Kovacs | |
| 7,871,575 | B2 | 1/2011 | Baeurle et al. | |
| 2002/0119078 | A1 * | 8/2002 | Jansa | B01D 11/00 422/400 |
| 2012/0025521 | A1 * | 2/2012 | Baller | B01J 19/0093 285/328 |

* cited by examiner

*Primary Examiner* — Jennifer Wecker
(74) *Attorney, Agent, or Firm* — Stephen R. Otis

(57) ABSTRACT

In illustrative implementations of this invention, microfluidic perfusion tubing is easily and precisely inserted into a microfluidic device. The tubing is inserted in a manner that aligns one or more holes in the perfusion tubing with one or more channels in the microfluidic device. For example, a hole in the tip of a perfusion tube may open into a channel in the microfluidic device. Or, multiple holes in a tube may open into different channels in a microfluidic device. The system may include a microfluidic device, two or more couplers, and a support frame. The microfluidic device may be inserted into a recessed region of the support frame, and the couplers may be attached to the support frame. The effect of doing so is to fix the position of the components relative to each other, and to precisely align holes in the tubes with channels in the microfluidic device.

20 Claims, 10 Drawing Sheets

METHODS AND APPARATUS FOR MICROFLUIDIC PERFUSION

RELATED APPLICATION

This application claims the benefit of U.S. Provisional Patent Application No. 62/164,072, filed May 20, 2015, the entire disclosure of which is herein incorporated by reference.

FIELD OF TECHNOLOGY

The present invention relates generally to microfluidic devices.

SUMMARY

In illustrative implementations of this invention, microfluidic perfusion tubing is easily and precisely inserted into a microfluidic device. The tubing is inserted in a manner that precisely aligns holes in the perfusion tubing with channels in the microfluidic device. For example, a hole in the tip of a perfusion tube may open into a channel in the microfluidic device. Or, multiple holes in a perfusion tube (e.g., one hole at the tip of the tube and other holes in the side of the tube) may open into different channels.

The precise alignment may be achieved by several features:

First, a support frame may include a recessed region. When a microfluidic device is inserted into the recessed region, the recessed region supports, and constrains the movement of, the microfluidic device.

Second, at least two rigid couplers may include rigid perfusion tubes. Flexible tubing may be attached to one end of the rigid perfusion tubes. The other end of the rigid perfusion tubes may be inserted into the microfluidic device Third, each rigid coupler may be attached to the support frame in such a manner that, when the respective coupler and support structure are attached to each other and the microfluidic device is located in the recessed region: (A) the positions of the support frame, coupler, and microfluidic device are fixed relative to each other; and (B) at least one hole in at least one tube in each respective coupler opens into a channel of the microfluidic device.

For example, in some cases, a first coupler is attached to at one end of the support frame and a second coupler is attached at the opposite end of the support frame. Fluid flows through tubing in the first coupler into the microfluidic device, and flows out of the microfluidic device into tubing in the second coupler.

In some cases, a coupler is attached to the support frame by inserting a peg of the coupler into a hole in the support frame. In other cases, a coupler is attached to the support frame by screwing a screw into threaded holes in the coupler and in the support structure.

Each rigid coupler may be easily and repeatedly attached to, and separated from, the support frame without damage. The microfluidic device may be easily and repeatedly inserted into, and removed from, the recessed region of the support frame.

In some cases, each rigid coupler has a homogeneous material composition (for example, all metallic). In other cases, each rigid coupler has a material composition that varies (e.g., such that the perfusion tubes are metallic, and the remainder of the coupler is not metallic).

In some cases, the support frame has one or two protuberances and the microfluidic device has one or two matching indentations. When the microfluidic device is inserted into the recessed region of the microfluidic device, the protuberance(s) fit into over the indentation(s). If two protuberances and two matching indentations are employed, they may ensure that the correct side of the microfluidic device is facing up. They may also ensure that a specific desired edge of the microfluidic device is adjacent to a specific desired edge of the support frame (and thus, for example, ensure that an inlet tube of a coupler is inserted into an inlet port—and not an outlet port—of the microfluidic device). Alternatively, the protuberances may be part of the microfluidic device and the indentations may be in the support frame.

In some cases, the support frame includes a central opening and at least a region of the microfluidic device is substantially transparent. Light may pass through the opening and through the substantially transparent region of the microfluidic device. For example, illumination may pass through the opening in order to illuminate the microfluidic device for microscopic observation or to facilitate a camera capturing digital images of the device through a microscope.

This invention is not limited to positioning perfusion tubes such that the tubes open into microfluidic channels or chambers. In illustrative implementations, the couplers may precisely position any object at or any adjacent to any region or component of an MFD. For example, in some cases: (a) a coupler includes—as a component of the coupler—perfusion tubing, pneumatic actuators, or electrical wiring; and (b) attaching the coupler to the support frame precisely positions the perfusion tubing, pneumatic actuator, or electrical wiring at an exact position in the MFD. In some cases, when the pegs of a pegged coupler are fully inserted into the guide holes of the support frame, the object being positioned (e.g., perfusion tubing, pneumatic actuator, or electrical wire) is precisely positioned in or adjacent to any component or region of an MFD, including an inlet perfusion port, outlet perfusion port, valve connector, sensing electrode or actuating electrode.

The description of the present invention in the Summary and Abstract sections hereof is just a summary. It is intended only to give a general introduction to some illustrative implementations of this invention. It does not describe all of the details and variations of this invention. Likewise, the descriptions of this invention in the Field of Technology section is not limiting; instead it identifies, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

FIG. 31 shows an original "starting point" design in which (a) a support frame has width W, length L, and one chiral protuberance, and (b) Nin=Nout=3.

FIG. 32 shows results obtained if both W and N are scaled by a factor of 2.

FIG. 33 shows results obtained if the width W is scaled by a factor 2, but Nin and Nout remain unchanged.

Figure 1:
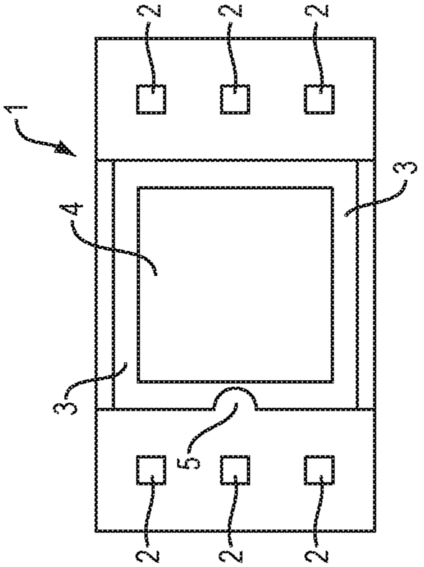
FIG. 1 is a top view of a support frame that has guide holes for attaching the frame to two pegged couplers.

The above Figures show some illustrative implementations of this invention, or provide information that relates to those implementations. However, this invention may be implemented in many other ways.

DETAILED DESCRIPTION

Precise Positioning

Problem: Conventional perfusion tubing for microfluidic devices (MFDs) suffers from the following problem: It is difficult and time-consuming to manually insert a millimeter-sized perfusion tube into an MFD, such that tip of the tube is precisely positioned to open into a micron-sized microfluidic channel in the MFD. Often, the tip of the tubing ends up in the wrong position. Even a slight displacement from the correct position may partially or fully block perfusion, or cause leaks, delamination, or contamination.

Solution: In illustrative implementations of this invention, this problem is solved, as follows:

A rigid support frame includes a recessed region. A microfluidic device (MFD) is inserted into the recessed region, such that the inner walls of the support frame support the MFD and fix the position of the MFD relative to the support frame. For example, in some cases, the MFD comprises a glass microscope slide and one or more layers of PDMS (polydimethylsiloxane). The MFD is inserted into the recess of the support frame, such that when the MFD is fully inserted: (a) inner walls or flanges of the support frame prevent the MFD from moving horizontally past these inner walls or flanges; and (b) a bottom shelf or flange of the support frame prevents the MFD from moving downward past the bottom shelf or flange.

The support frame includes multiple guide holes.

A rigid component (hereinafter "coupler") is used to connect perfusion tubing to the MFD. The coupler includes one or more rigid tubes (e.g. metal tubes). The coupler also includes multiple pegs.

In some cases, the multiple pegs on a single coupler all have the same geometry. Alternatively, in other cases the multiple pegs on a single coupler have varying geometries to ensure proper orientation or positioning of the coupler relative to the support frame. In some cases, different couplers have different features (e.g., number or placement of perfusion tubes) but have pegs that have the same geometry (or same set of geometries), such that different couplers may be inserted into the support frame. Alternatively, in some cases, the geometry (or set of geometries) of the pegs varies from coupler to coupler, to ensure that couplers that differ in other respects are not inadvertently interchanged.

The support frame and coupler are configured such that: (a) the pegs of the coupler may be easily and repeatedly inserted into, and removed from, the guide holes in the support frame; (b) as the pegs of the coupler are inserted into the guide holes of the support frame, the guide holes guide and constrain the movement of the coupler; and (c) when the pegs of the coupler are fully inserted into the guide holes, the tip of each rigid tube is precisely positioned at a specified x, y, z position relative to the support frame (and thus at a specified x, y, z position relative to the MFD, because the MFD is resting in the recess of the support frame).

For example, in some cases a coupler has metal perfusion tubes. A user may, simply by inserting the pegs of the coupler into the guide holes of the support frame, position a tip of each metal tube, respectively, at an exact x, y, z position in the MFD. The guide holes in the support frame guide and constrain movement of the coupler, as the pegs of the couplers are inserted into the guide holes. This causes each tip of the metal tubes to come to rest, when the pegs of the coupler are fully inserted into the guide holes, at a precise, pre-determined target position relative to the support frame and the MFD. The guide holes thus control positioning of the metal tubes relative to the support frame and MFD.

As used herein, a peg is "fully inserted" into a guide hole when inner walls of the guide hole prevent the peg from being inserted further into the guide hole.

For example, in some cases, when the pegs of the coupler are fully inserted into the guide holes of the support frame, the tip of a metal tube of the coupler is positioned such that the tip opens into a microfluidic channel, microfluidic chamber or other microfluidic structure in the MFD.

In many cases, the positioning is accurate to within microns.

This invention is not limited to positioning perfusion tubes such that the tubes open into microfluidic channels or chambers. In illustrative implementations, the couplers may precisely position any object at or any adjacent to any region or component of an MFD. For example, in some cases: (a) a coupler includes—as a component of the coupler—perfusion tubing, pneumatic actuators, or electrical wiring; and (b) attaching the coupler to the support frame precisely positions the perfusion tubing, pneumatic actuator, or electrical wiring at an exact position in the MFD. In some cases, when the pegs of a pegged coupler are fully inserted into the guide holes of the support frame, the object being positioned (e.g., perfusion tubing, pneumatic actuator, or electrical wire) is precisely positioned in or adjacent to any component or region of an MFD, including an inlet perfusion port, outlet perfusion port, valve connector, sensing electrode or actuating electrode.

In some cases, when the coupler is inserted into the MFD, the rigid tubes of the coupler are positioned such that the all of the tubes end at the same depth in the MFD—or are positioned such that the all of the tubes end in a single level of the MFD or in a single layer of PDMS of the MFD.

In other cases, the couplers are used with a multi-level MFD. For example, in some cases, when a coupler is inserted into the MFD, the rigid tubes of the coupler are positioned such that the tubes end at different depths, layers or levels of the MFD. For example, in some cases, when a coupler is inserted into the MFD, some of the rigid tubes end at a first depth and open into microfluidic channels at the first depth and another rigid tube of the coupler opens into a channel at a different depth that is used for pneumatic activation.

In many implementations, a coupler comprises a "pegged coupler", that is, the tubes in the coupler comprise a different material than that of the main body and pegs of the coupler. For example, in many cases, the tubes of a pegged coupler are metal and the main body and pegs of the coupler are non-metallic.

In many implementations, when the MFD is inserted into a recess of the support frame, the position of the MFD is fixed relative to the support frame, except that the MFD may be easily removed from the support frame by moving the MFD away from the support frame along an insertion path. Likewise, in many implementations, when the pegs of a coupler are fully inserted into a support frame, the position of the coupler is fixed relative to the support frame, except that the coupler may be easily removed from the support frame by moving the coupler away from the support frame along an insertion path. As used herein, an "insertion path" means the path traveled by an inserted object, as the object is inserted.

Protection from Stress

Problem: Perfusion tubing causes stresses/strains/shears to the MFD. For example, these stresses/strains/shears may occur when the MFD (to which the tubing is attached) is moved to or from a microscope. Or, in some cases, these stresses/strains/shears are created by microscope sample holders, oil-immersion objectives, or G-forces during centrifugation. In conventional perfusion tubing, these stresses are transmitted to the region where the tubing touches the MFD. Transmitting these stresses to the region where the perfusion tubing touches the MFD sometimes: (a) causes leaks or delamination of PDMS in the MFD, (b) causes the conventional tubing to move relative to the MFD (so that the tubing is no longer aligned with the desired microfluidic channel) or (c) causes the conventional tubing or MFD to undergo strain (deformation) that partially or fully blocks perfusion through the tubing.

Solution: In illustrative implementations of this invention, this problem is solved, as follows:

In illustrative implementations, one end of the rigid tubes of a coupler are connected to flexible perfusion tubing. The other end of the rigid tubes of the coupler are inserted into the MFD.

In illustrative implementations of this invention, stresses placed on the flexible tubing are not transferred to the MFD. That is because: (a) the position of the rigid tubes of the coupler is fixed relative to the rest of the coupler; (b) the position of the coupler is fixed relative to the support frame, when the pegs of the coupler are inserted into the guide holes of the support frame; and (c) the position of the support frame is fixed relative to the MFP, when the MFP is inserted into the recess of the support frame.

For example, in some cases, the rigid tubes of the coupler comprise metal or a rigid plastic or other rigid polymer.

Bar Coupler

Alternatively, in some cases, a different type of coupler (a "bar coupler") is used. The rigid tubes of the bar coupler are not inserted into the microfluidic device (MFD). The tubes of the bar coupler open into holes in the bottom side of the bar coupler, and do not extend past the bottom side of the bar coupler. In some cases, the inner diameter of each tube of the coupler is constant throughout a portion of the coupler, and then expands in a region near the bottom side of the coupler, so that the tube ends in a chamfered hole in the bottom side of the bar coupler. The chamfered hole widens as it approaches the bottom side of the bar coupler.

In some cases, the bar coupler is precisely positioned relative to the support frame (and the MFD) by a screw or bolt that is inserted though guide holes in the bar coupler and support frame. Inserting the screw or bolt through the guide holes causes the tube holes (openings of the tubes) at the bottom of the bar coupler to be precisely positioned. For example, in some cases the tube holes are precisely positioned over ports to microfluidic channels in the MFD.

In some cases, perfusion tubes terminate at a hole in the side of the bar coupler, but do not extend into the MFD. The MFD is locked into position relative to the bar coupler by, among other things, the pressure provided by screws or magnets that press the bar coupler against the PDMS. The PDMS functions as its own "gasket" for sealing.

Asymmetry to Ensure Correct Orientation of Microfluidic Device

In some cases, a single protuberance on one of the inner walls or flanges of the support frame makes these inner walls or flanges asymmetrical. The protuberance fits into a matching notch in an outer wall of the MFD, when the MFD is inserted into the recessed portion of the MFD. The matching protuberance and notch prevent the MFD from being inserted (into the recess of the support frame) in a position in which the protuberance does not fit into the notch.

The protuberance and notch ensure that the MFD is oriented correctly, when the MFD is inserted into the recessed portion of the support frame. This prevents an otherwise easy-to-make error from occurring, in which the MFD is inserted facing in the wrong direction, causing, for example, the inlet ports of the MFD to be aligned with outlet perfusion tubes of a coupler.

The protuberance and notch create an asymmetry, which prevents an MFD from being incorrectly oriented relative to the support frame—and thus prevents the MFD from being positioned incorrectly relative to perfusion tubing that is part of couplers that are inserted into the support frame.

For example, in some cases: (a) the MFD (e.g., a microscope slide and adjacent PDMS layers) is roughly rectangular in shape, with four sides, two of which are long sides and two of which are short sides, the short sides being shorter than the long sides; (b) four inner walls of the support frame adjoin the sides of the MFD, two of which are long inner walls and two of which are short inner walls, the short inner walls being shorter than the long inner walls; (c) one of the short inner walls of the support frame has a protuberance, and one of the short sides of the MFD has a notch; (d) when the MFD is inserted into the recessed region of the support frame, the protuberance fits into the notch, and (e) the protuberance and notch prevent the MFD from being inserted into the recess of the support frame in a position in which the notch does not fit into the protuberance. In this example, the notch and protuberance would prevent the MFD from being inserted into the support frame such that the protuberance (in a short inner wall of the support frame) would be adjacent to a short side of the MFD that did not have the notch.

In the preceding example, the single notch and single protuberance would not prevent the MFD from being flipped over. For example, it would not prevent an MFD that comprises a glass microscope slide and PDMS layer, from being inadvertently flipped over, so that the side which is normally on top is instead on bottom.

To prevent the MFD from being inadvertently flipped over, two protuberances and two notches may be used. For example, in some cases: (a) two inner walls of the support frame have a total of two protuberances, a first protuberance on a first inner wall and a second protuberance on a second inner wall, with no protuberances on the remaining inner walls; (b) two sides of the MFD have a total of two notches, a first notch in a first side and a second notch in a second side, with no notches in the remaining sides; (c) the two protuberances fit into the two notches, when the MFD is inserted into the recessed portion of the support frame; and (c) the two protuberances and two matching notches prevent the MFD from being inserted into the MFD in a position in which the two protuberances do not fit into the two notches.

Alternatively, the positions of the notch(es) and protuberance(s) are switched. For example, in some cases, the notch(es) are in the MFD and the matching protuberance(s) are in the inner walls of the support frame, instead of vice versa. For example, in each of the examples above, the positions of the notch(es) and protuberance(s) may be switched, such that protuberance(s) in the inner walls of the support frame are replaced by notch(es) and notch(es) in the MFD are replaced by protuberance(s).

As used herein, a "chiral notch" means a notch described in this Asymmetry to Ensure Correct Orientation of Microfluidic Device section. As used herein, a "chiral protuberance" means a protuberance described in this Asymmetry to Ensure Correct Orientation of Microfluidic Device section.

Multiple Couplers for a Single Support Frame

In many implementations, multiple couplers are inserted into a single support frame. For example, in some cases: (a) the support frame and MFD are each rectangular; (b) when the MFD is inserted into the support frame, a first end of the MFD is adjacent to a first end of the support frame and a second end of the MFD is adjacent to a second end of the MFD (the first and second ends in each case being at opposite ends along the longest dimension of the rectangular shape); (b) inlet perfusion ports are located at or adjacent to the first end of the MFD; (c) outlet perfusion ports are located at or adjacent to the second end of the MFD; (c) a first coupler is inserted into the first end of the support frame, such that inlet perfusion tubes in the first coupler align with the inlet perfusion ports of the MFD; and (d) a second coupler is inserted into the second end of the support frame, such that outlet perfusion tubes in the second coupler align with the outlet perfusion ports of the MFD.

Helpful Features for Microscopy

In many implementations, the support frame is roughly rectangular in shape, with a large central hole. The large central hole allows light to pass through the support frame, to illuminate or pass through the MFD when the MFD is inserted into the support frame. For example, in many cases, when the MFD is mounted on a translation stage of a microscope, the large central hole functions as a window for imaging or illumination.

In illustrative implementations, the support frame is configured to be easily held in a desired position by a microscope sample holder. For example, in many cases: (a) the support frame is rectangular; (b) a spring-loaded movable arm of a microscope sample holder presses the rectangular support frame against a corner formed by two walls or flanges of the sample holder that are at right angles to each other; and (c) as a result, the support frame (and the MFD that is inserted in the support frame) moves with the translation stage of the microscope—that is, moves in the same direction and by the same amount as the translation stage moves.

A "microfluidic cartridge" or "MFD cartridge" means a support structure, one or more couplers, and a microfluidic device, which are assembled such that the support structure, one or more couplers, and the microfluidic device are fixed in position relative to each other. An MFD cartridge may be assembled by inserting the microfluidic device into a recessed region of the support frame, and by attaching the one or more couplers to the support frame. For example, the one or more couplers may be attached to the support frame by inserting pegs of pegged couplers into guide holes of the support frame, or by tightening a screw in screw holes in a bar coupler and the support frame.

Advantageously, in many implementations, an MFD cartridge may be easily flipped over (e.g., such that a microscope slide which is the top layer of the MFD becomes the bottom layer of the MFD). This is helpful for microscopy imaging of the MFD from two angles that differ by 180 degrees.

For example, in some cases, when the couplers are inserted into the support frame: (a) the main body of the couplers are above the support frame and the pegs of the couplers are positioned inside the guide holes of the support frame; (b) the bottom of the support frame and the tops of the couplers are planar and lie in parallel planes; and (c) the MFD cartridge lies flat on a planar surface of a microscope sample holder, regardless of whether the MFD cartridge is flipped over (i.e., regardless of whether the MFD cartridge is positioned such that the main body of each coupler is above the support frame, or whether the MFD cartridge is flipped over so that the main body of each coupler is below the support frame).

In some cases, a slide holder is affixed to the MFD cartridge. When the MFD is placed in a microscope, the slide holder catches possible leaks, protects the microscope's objective lens and other delicate microscope parts, and prevents cross contamination between different MFDs.

In some cases, an MFD cartridge streamlines and standardizes the safe mounting of actively perfused MFDs to many different types of microscope sample holders that rely on rectangular symmetry.

Optional Transparency

In some cases, the support frame and couplers are transparent. The transparency facilitates visual observations, including visual checks for leaks or delamination of the PDMS near the inlet ports and outlet ports.

Agnostic to MFD Architecture

In illustrative implementations, the support frame and couplers are generally agnostic to the interior architecture of the microfluidic device (MFD), such as the number, placement and type of internal features of the MFD. In many cases (subject to the exception described in the next paragraph), the support frames and couplers may be used with any appropriately sized MFD, regardless of what is inside the MFD—e.g., regardless of the placement, number or presence of microfluidic channels, electrochemical or potentiostatic microelectrodes, piezoelecric actuators, pneumatic actuators, valves, or vibrating mixers in the MFD.

However, in many cases, there is an exception: the couplers and support frame are chosen such that certain input and output features of the MFD correspond to the input and output provided by the couplers.

For example, each MFD inlet port and MFD outlet port that is being used aligns with an inlet perfusion tube or outlet perfusion tube of a coupler. In some cases, there are more inlet tubes in the coupler than inlet ports in the MFD. In that case, the excess tubes are not used for perfusion. However, they may tend to anchor the MFD in place, which is helpful.

In some cases, the coupler precisely positions an object other than a perfusion tube, and the object provides an input to the MFD or receives an output from the MFD. For example, in some cases: (a) the MFD includes a sensor electrode; (b) the coupler positions an electrical wire in the MFD; and (c) the coupler is selected such that the wire is properly positioned to connect to the sensor electrode Modularity In illustrative implementations, a small set of hard, tough standardized parts facilitate handling, alignment, mounting, interfacing and perfusing MFDs of arbitrary internal architectures.

In illustrative implementations, hardware component types such as support frames and couplers comprise a robust, modular, reconfigurable, parametrically scalable, MFD connection and perfusion system.

In illustrative implementation, a small number of different type of components are compatible with a wide variety of internal MFD architectures.

In illustrative implementations, a set of different couplers with different features share the same peg dimensions. Thus, the different couplers with different features may be attached to any support frame that has guide holes with matching dimensions.

For example, in some cases, different types of couplers have a different number, position or diameter of rigid tubes, but the different types of couplers all share the same peg dimensions. These different types of couplers may be inserted into a single support frame with guide holes that match those peg dimensions.

In many cases, an MFD has any arbitrary internal architecture, except that each MFD input or output feature (that is being used) aligns with an input or output feature of a type of coupler.

In some cases, only a subset of the common MFD features such as inlets and outlets are actually addressed by coupler tubes. This allows a wide variety of MFD architectures of arbitrary internal geometry to share a common form factor such as port and valving connector locations.

Alternative Implementations

This invention may be implemented in many different ways. Here are some non-limiting examples.

A wide variety of support frames may be employed. For example, in some cases, a support frame is configured to support a single-level MFD, to support a multi-level MFD, to support a flat-PDMS/etched glass MFD, to support a flat glass/etched PDMS MFD, or to support an MFD used in fluorescent microscopy or confocal microscopy.

A wide variety of couplers may be used, such as a pegged coupler or bar coupler.

The support frames and couplers (including, in some cases, different types of support frames or couplers) may be interconnected in different geometries (for instance parallel, series, or cascading). This facilitates simple reconfiguration to achieve different modes of operation.

This invention is not limited to inserting a microfluidic device (MFD) into a recess of a support frame. More generally, the MFD may be releasably attached to the support frame by any mechanism, such that (when so attached) the position of the MFD is fixed relative to the support frame. In the above discussion, each example of an MFD being inserted into a recess of the support frame may be replaced by an example in which the MFD is releasably attached to the support frame. As used herein, a first item is "releasably" attached to a second item if the attachment that joins the first and second items is releasable.

For example, in some cases, the MFD is releasably attached to the support frame by one or more of the following joinder devices: (a) a snap-fit or other elastically deformable mechanism that presses two or more surfaces together; (b) a screw, press, clamp or other mechanism that presses the MFD against the support frame; (c) magnets, a hook and loop fastener, Velcro®, a zipper, flexures, springs, tensioners or any mechanism that creates frictional, magnetic or other forces that tend to immobilize the MFD relative to the support frame; or (d) screws or any other configuration of surfaces of the MFD or support frame that tends to constrain or prevent motion of the MFD relative to the support frame in some directions or paths, and to permit motion of the MFD relative to the support frame only in a specific direction or path, such as along an insertion path.

This invention is not limited to inserting pegs of a coupler into a guide holes of a support frame. More generally, a coupler (e.g., a pegged coupler or bar coupler) may be releasably attached to a support frame by any mechanism that precisely positions the coupler (including tubes that are part of the coupler) relative to the support frame. In the above discussion, each instance of pegs of a coupler being inserted into guide holes (or screws being inserted into screw holes) of a support frame may be replaced by an instance in which the coupler is releasably attached to the support frame, such that the coupler is precisely positioned relative to the support frame.

For example, in some cases, a coupler is releasably attached to a support frame by any of the following joinder devices: (a) a snap-fit or other elastically deformable mechanism that presses two or more surfaces together; (b) a press, clamp or other mechanism that presses the coupler against the support frame; (c) magnets, a hook and loop fastener, Velcro®, a zipper, or any mechanism that creates a frictional, magnetic or other force that tends to prevent motion of the coupler relative to the support frame; or (d) screws or any other configuration of surfaces of the coupler or support frame that tends to constrain or prevent motion of the coupler relative to the support frame in some directions or paths, and to permit motion of the coupler relative to the support frame only in a specific direction or path.

Parametric Scaling

In illustrative implementations, scaling of MFD dimensions is parametrized by global physical constraints and local (user selected) attributes to maximize interchangeability and re-use of a small number of standardized support frame and coupler parts to address a wide variety of MFD architectures.

In illustrative implementations, applying the principles of parametric scaling facilitates modularity, reuse of parts, retooling and speed and efficiency of creating bills of materials from a pre-made set of parts to meet new design demands.

In illustrative implementations, the global physical constraints include: (a) PDMS surrounding each tube has a minimum width and depth, both of which scale with the gauge of the tube; and (b) in multi-floor devices, there is a minimum thickness of separation PDMS layers between vertical layers of the MFD which dictates the minimum distance of vertical holes in the tubing.

In illustrative implementations, encoding these global physical constraints into the rules of a design tool simplifies MFD design considerations by standardizing connectivity of interchangeable parts.

In some implementations, a small number of base designs are mass-produced and each type customized by manual assembly instead of re-casting.

For example, in some case, for N=1, N=2, or N=3, where N means the number of inlet ports, a single coupler and single support frame may be used to position tube(s) in an MFD. In all three of these cases the N=3 design is sufficient. To achieve N=2 or N=1, less than 3 tubes are used.

Dummy couplers and spacers may be added at low cost. The dummy coupler or spacer is a component that fits in the same space normally occupied by an active coupler but instead it is there simply to fill space providing “footprint” and mechanical support against a microscope slide holder tensioner that is the same as the “footprint” and mechanical support that would exist if the space were occupied by an active coupler. For purposes of the preceding sentence, an “active coupler” means a coupler that it attached to a support frame in such a way that the coupler contains a tube through which fluid flows when a microfluidic device (which is resting in the support frame) is perfused.

In some cases, three N=1 devices are achieved sequentially by simply moving the coupler to the next slot.

In some cases, the user-specified constraints include: (1) Nin=number of perfusion inlets tubes; (2) Nout=number of perfusion outlets; (3) Nf=number of MFD floors; (4) W=width of the device; (5) L=length of the device; (6) t=vertical thickness of the device; (7) symmetry variables such as whether an inlet is centrally located; and (8) design invariants such as “inlets are equidistant to nearest neighbors as well as boundaries.

In some cases, one or more computers execute an algorithm. The steps of this algorithm include: (a) the user interface accepts input from a user regarding user-selected attributes; (b) a computer determines a set of couplers and support frames that satisfy both the user-specified attributes and global physical constraints, and (c) generates a bill of materials, which lists the couplers and support frame determined in step (b).

In some cases, parametric scaling does not change the size and shape of the chiral protuberance, only the number of chiral protuberances and their placement. This keeps the chiral protuberance size and shape invariant for all support frames and MFD designs. In some cases, parametric scaling automatically assigns the number and position of the notches to be created during the support frame manufacturing process and MFD casting processes. The user selects values of the user-specified attributes user such as Nin Nout, L, W. The parametric scaling software takes into account the global physical constraints. In some cases, the parametric scaling software takes into account additional considerations such as efficiency, modularity and part reuse. For example, for any N less than or equal to 3 for a support frame that has a W supporting up to N=3, the exact same couplers can be used as in the case of N=3, because some of the ports may be simply left unperfused. Thus, a number of different devices may be assembled using the same set of primary parts.

In some cases, the software causes a graphical use interface to display drop-down menus querying the user on user-specified attributes, such as “what is the width W?” and “What is the length L?”, and “What is the gauge?”. The user’s answer to the question “What is the gauge?” limits the possible range of acceptable answers to the next question such as “How many inlets Nin?” The acceptable range is 1–Nmax In some cases, Nmax is automatically computed from the W, L and gauge inputs by respecting the physical constraints governing the amount of material around each tube necessary to support and center the device.

Drawings

FIG. 1 is a top view of a support frame 1 that is configured to be attached to pegged couplers. Frame 1 includes guide holes 2. Each guide hole 2 is configured such that a peg of a pegged coupler may be inserted into the guide hole 2, to attach the frame to the pegged coupler.

In FIG. 1, protuberance 5 of frame 1 is configured to be inserted into a matching notch (not shown in FIG. 1) in a microfluidic device (MFD). The protuberance 5 of the frame and the matching notch in the MFD, taken together, have the effect of limiting the allowable orientations in which the MFD may be inserted into the recess in frame 1.

Figure 2:
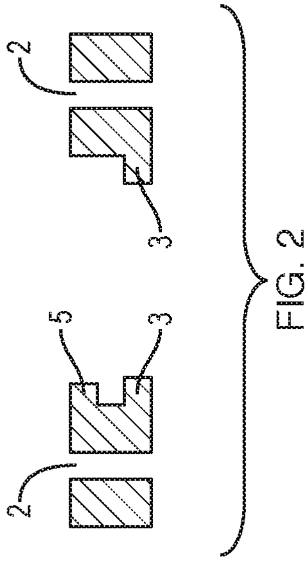
FIG. 2 is a cross-sectional view of the support frame shown in FIG. 1.

FIG. 2 is a cross-sectional view of the support frame shown in FIG. 1. The four cross-hatched regions in FIG. 2 are all part of that support frame 1, which is a single integral structure.

Figure 3:
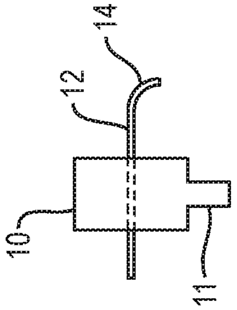
FIG. 3 is a side view of a pegged coupler.

FIG. 3 is a side view of a pegged coupler 10. The pegged coupler 10 includes one or more pegs (e.g., 11), that are each configured to be inserted into a guide hole 2 of a support frame 1. The pegged coupler is penetrated by, and rigidly attached to, perfusion tubes (e.g., 12). In some cases, the perfusion tubes (e.g., 12) each have a terminal region 14. The terminal region 14 is configured to be inserted into an MFD, while the MFD is resting on a recessed flange 3 of support frame 1. In some cases, the terminal region 14 is curved along its length, such that its center line is curved. In some cases, a pegged coupler 10, including its peg(s) and perfusion tubing, has a homogeneous material composition (e.g., all metal). In some cases, a pegged coupler 10, including its peg(s) and perfusion tubing, has a varying material composition (e.g., metallic perfusion tubing and non-metallic main body and peg(s)).

Figure 4:
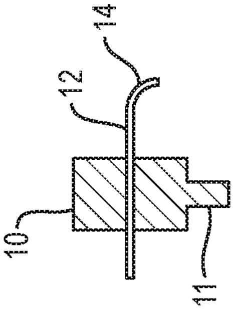
FIG. 4 is a cross-sectional view of the pegged coupler shown in FIG. 3.

FIG. 4 is a cross-sectional view of a pegged coupler.

Figure 5:
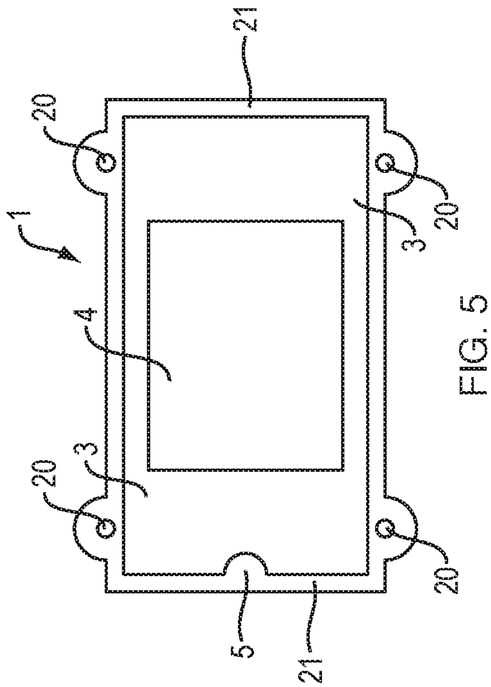
FIG. 5 is a top view of a support frame that has screw holes for attaching the frame to two bar couplers.
Figure 6:
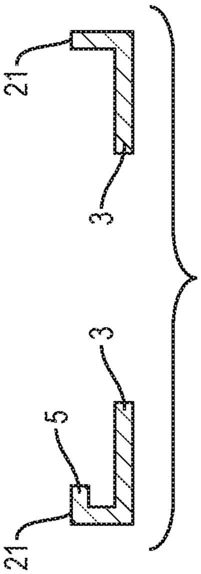
FIG. 6 is a cross-sectional view of the support frame shown in FIG. 5.

FIG. 5 is a top view of a support frame that is configured to be attached to two bar couplers. Frame 1 includes screw holes 20. Each screw hole 20 is configured such that a screw may be inserted through a hole 31 of a bar coupler 30 and then into screw hole 20, to attach the frame to the bar coupler. In FIGS. 5 and 6, the top of recessed flange 3 is lower than the top of outer wall 21 of the support frame 1.

Figure 19:
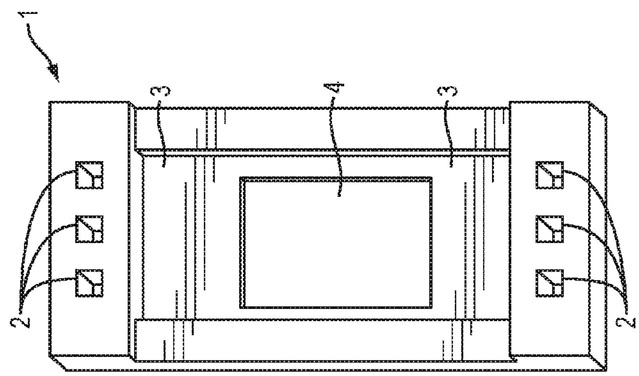
FIG. 19 is a perspective view of a support frame.

In FIGS. 1, 5 and 19, a recessed flange 3 of support frame 1 is configured to support, and constrain the movement of, a microfluidic device (MFD) inserted into a recessed region of the support frame 1. Light may pass through an opening 4 in the support frame. For example, illumination may pass through opening 4 to illuminate an MFD while a microscope captures images of the MFD.

FIG. 6 is a cross-sectional view of the support frame shown in FIG. 5. The two cross-hatched regions in FIG. 6 are part of frame 1, which is a single integral structure.

Figure 7:
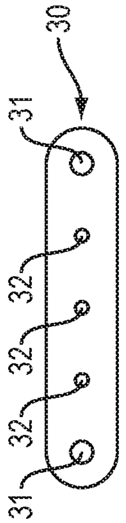
FIG. 7 is a top view of a bar coupler.

FIG. 7 is a top view of a bar coupler 30. The bar coupler 30 is penetrated by screw holes 31 and by channels 32.

Figure 8:
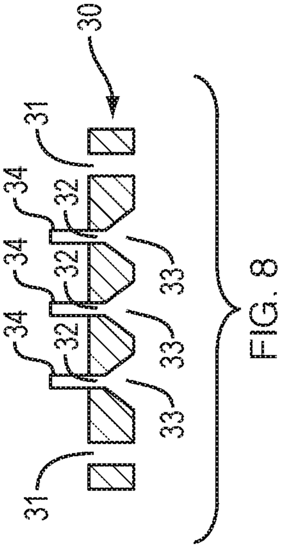
FIG. 8 is a cross-sectional view of the bar coupler shown in FIG. 7.

FIG. 8 is a cross-sectional view of the bar coupler 30 shown in FIG. 7. The six cross-hatched regions in FIG. 7 are regions in bar coupler 30. The bar coupler 30 is a single integral structure.

Figure 9:
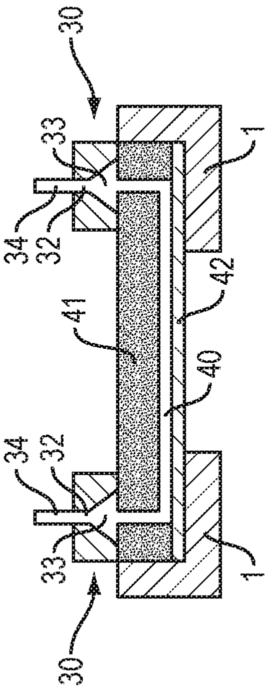
FIG. 9 is a cross-sectional view of an MFD cartridge, including a support frame attached to two bar couplers.

FIG. 9 is a cross-sectional view of an MFD cartridge. The MFD cartridge comprises a support frame 1, two bar couplers 30 (which are pressed firmly against frame 1), and a microfluidic device. The microfluidic device (labeled 70 in FIGS. 21-26) comprises a glass microscope slide 42, a PDMS substrate 41, and one or more microfluidic channels 40.

In FIGS. 8 and 9, perfusion tubing 34 is inserted into channels 32. Only the tips of tubing 34 are shown in FIGS. 8 and 9. Channels 32 spread out into chamfered openings 33 on a side (e.g., the bottom side in FIGS. 8 and 9) of the bar coupler 30.

Figure 10:
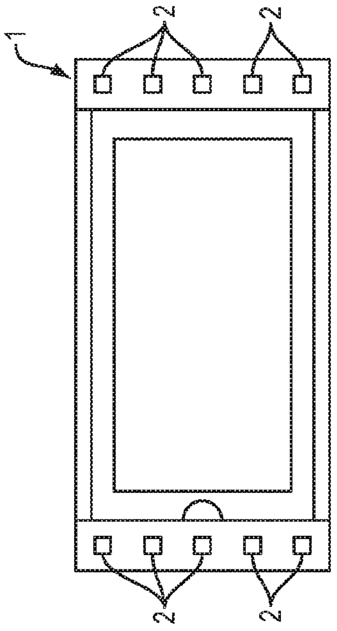
FIG. 10 shows a support frame, with guide holes in two sides of the support frame.

FIG. 10 shows a support frame 1, with guide holes 2 in two sides of the support frame.

Figure 11:
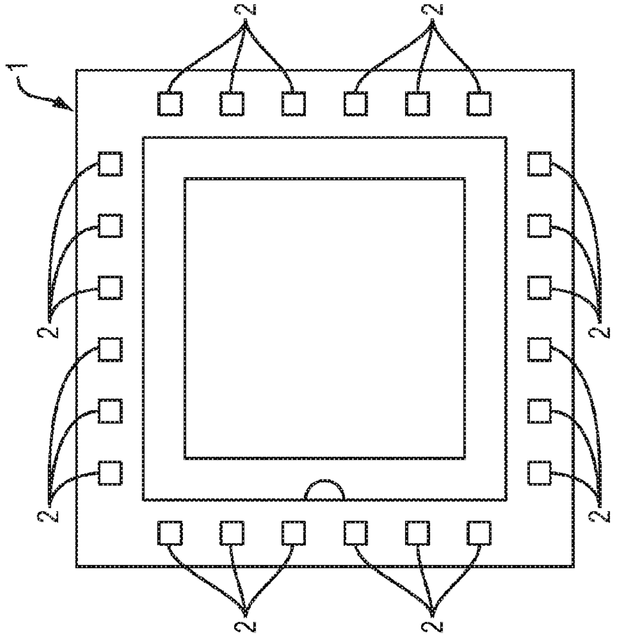
FIG. 11 shows another example of a support frame, with guide holes in four sides of the support frame.

FIG. 11 shows another example of a support frame 1, with guide holes 2 in four sides of the support frame.

Figure 12:
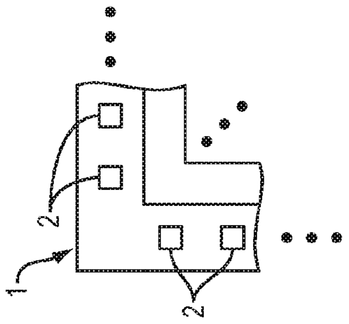
FIG. 12 shows a corner of a support frame.

FIG. 12 shows a corner of a support frame 1.

Figure 13:
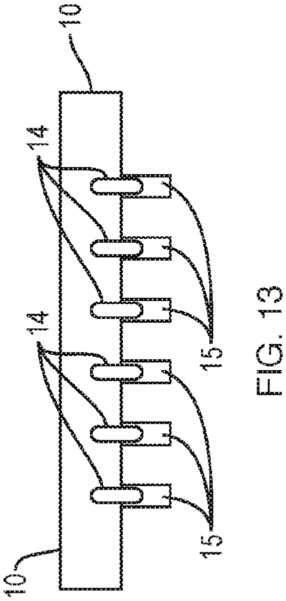
FIG. 13 is a cross-sectional view that shows perfusion tubes of a pegged coupler, which are inserted into channels in a microfluidic device.

FIG. 13 is a cross-sectional view that shows terminal regions 14 of perfusion tubes of a pegged coupler 10. The terminal regions 14 are inserted into channels 15 in a microfluidic device. The terminal regions 14 of the perfusion tubes shown in FIG. 13 are curved and bend down, but the curve is not visible in the perspective shown in FIG. 13.

Figure 14:
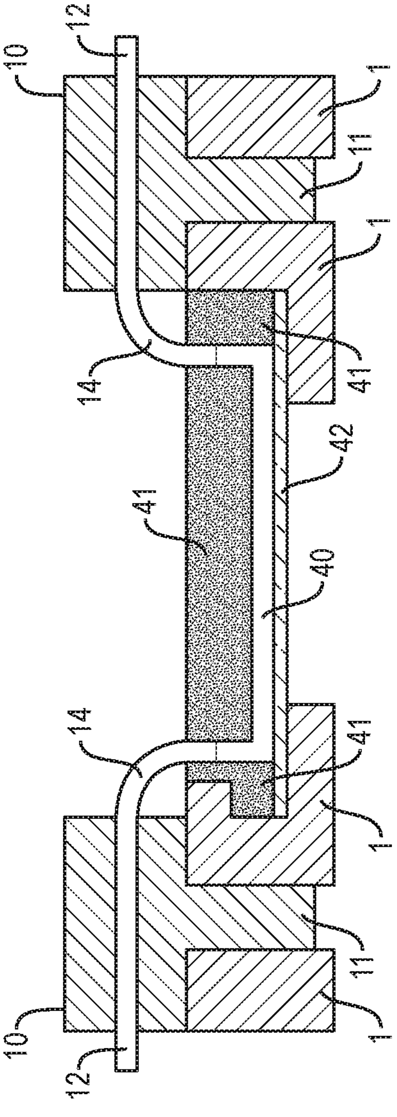
FIG. 14 is a cross-sectional view of an MFD cartridge, including a support frame attached to two pegged couplers.

FIG. 14 is a cross-sectional view of an MFD cartridge, including a support frame, two pegged couplers, and a microfluidic device. In the example shown in FIG. 14, the pegs 11 of two pegged couplers 10 have been inserted into support frame 1. In each pegged coupler, perfusion tubing 12 includes a terminal region 14 that has been inserted into a microfluidic device. The microfluidic device (labeled 70 in FIGS. 21-26) comprises a glass microscope slide 42, a PDMS substrate 41, and one or more microfluidic channels 40.

Figure 15:
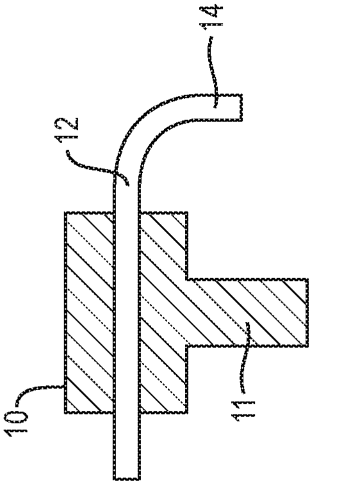
FIG. 15 is a cross-sectional view of a pegged coupler.

FIG. 15 is a cross-sectional view of a pegged coupler 10.

Figure 16:
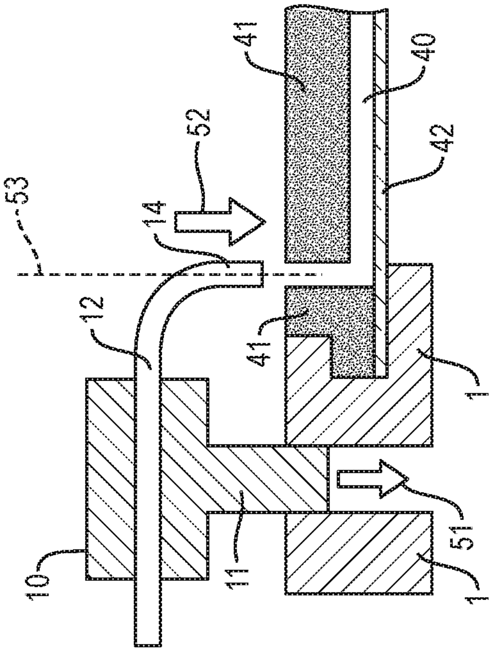
FIG. 16 shows a pegged coupler being attached to a support frame, by inserting a peg of the coupler into a guide hole of the support frame.

FIG. 16 shows a pegged coupler 10 being attached to a support frame 1, by inserting a peg 11 of the coupler into a guide hole of the support frame. Arrow 51 symbolizes the movement of the peg 11 relative to the support frame 1. Arrow 52 symbolizes the movement of the lower tip of terminal region 14 of the perfusion tubing. The movement symbolized by arrow 52: (a) is along an insertion path 53; and (b) is relative to the support frame 1 and to a microfluidic device that is resting in, and supported by, frame 1. The microfluidic device comprises slide 42, microfluidic channel 40 and PDMS substrate 41.

Figure 17:
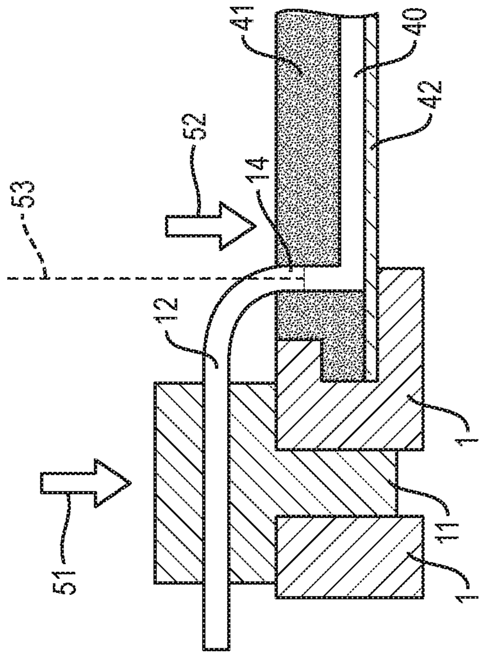
FIG. 17 shows a peg of a pegged coupler that has been attached to a support frame, such that the peg is fully inserted into a guide hole of the support frame.

FIG. 17 shows a peg 11 of a pegged coupler 10 that has been attached to a support frame 1, such that the peg is fully inserted into a guide hole of the support frame 1.

Figure 18:
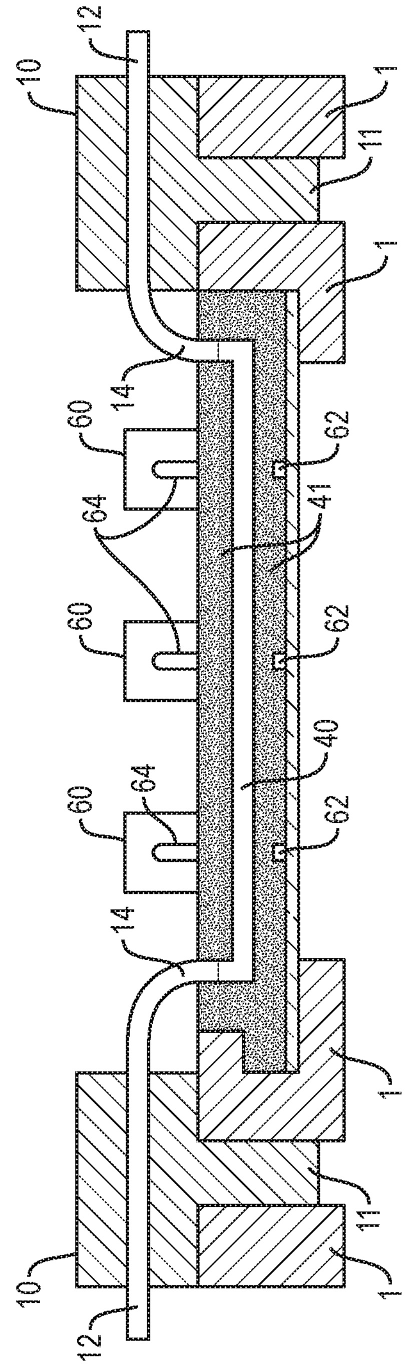
FIG. 18 shows an MFD cartridge that has two layers of microfluidic channels.

FIG. 18 shows an MFD cartridge that has two layers of microfluidic channels. In the example shown in FIG. 18, microfluidic channel 40 is in a top layer of microfluidic channels. Microfluidic channel 40 connects to perfusion tubing 12 in the two pegged couplers 10 shown on the right and left sides, respectively, of FIG. 18. Microfluidic channels 62 are in a bottom layer of microfluidic channels. Microfluidic channels 62 attach to other perfusion tubing (including perfusion tubing 64 in pegged couplers 60 on a side of the support frame 1, and to other pegged couplers on another side of support frame 1).

In FIGS. 14, 17 and 18, a faint horizontal line appears at the bottom of each terminal region 14 of a perfusion tube of a coupler (that is shown in those Figures). The faint horizontal line indicates the bottom edge of the terminal region 14 of the perfusion tube of a coupler. However, in each case shown in FIGS. 14, 17 and 18, the terminal region 14 of the perfusion tube opens into channel 40 of the microfluidic device, such that fluid, liquid or gas may flow from terminal region 14 into channel 40, or from channel 40 into terminal region 14.

FIG. 19 is a perspective view of a support frame. Frame 1 includes guide holes 2. Each guide hole 2 is configured such that a peg of a pegged coupler may be inserted into the guide hole 2, to attach the frame to the pegged coupler. Flange 3 is configured to support a microfluidic device inserted into the recessed, central region of frame 1. Opening 4 is a "window" through which light might shine.

Figure 20:
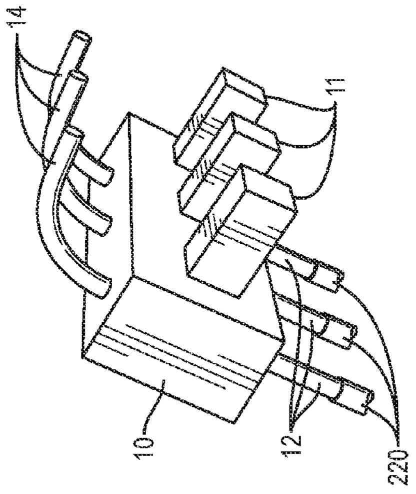
FIG. 20 is a perspective view of a pegged coupler.

FIG. 20 is a perspective view of a pegged coupler. The pegged coupler 10 includes three pegs 11, that are each configured to be inserted into a guide hole 2 of a support frame 1. The pegged coupler 10 is penetrated by, and rigidly attached to, three perfusion tubes 12. The perfusion tubes 12 each have a terminal region 14. Each terminal region 14 is configured to be inserted into an MFD, while the MFD is resting on a recessed flange 3 of support frame 1. In FIG. 20, the perfusion tubes 12 are connected to other tubing 220. The other tubing 220 may be flexible, and the pegged coupler 10 (including perfusion tubes 12) may be rigid. In FIG. 20, each perfusion tube 12 has two ends. One end is the terminal end 14; the other end is the end to which the other tubing 220 is attached.

Figure 21:
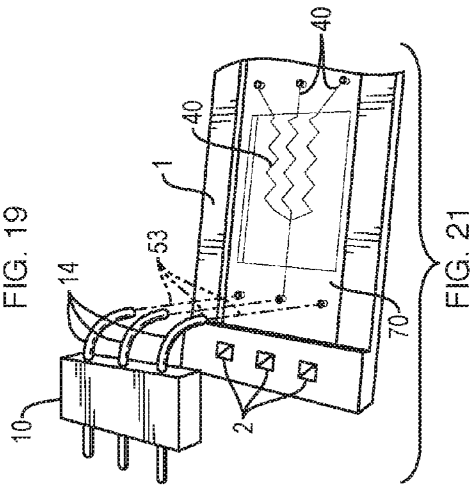
FIG. 21 is a perspective view of a pegged coupler being inserted into a support frame.

FIG. 21 is a perspective view of a pegged coupler 10 being inserted into a support frame. Each perfusion tube has a terminal region 14. A portion of each terminal region is curved along its length. The end of the terminal region 14 of each perfusion tube is traveling along an insertion path 53. Later in the insertion process: (a) pegs 11 of pegged coupler (which pegs are at the bottom of the pegged coupler 10 and are not visible in FIG. 21) will be inserted into guide holes 2 of the support frame 1; and (b) the terminal regions 14 of the perfusion tubes will be inserted into vertical channels in the microfluidic device 70. These vertical channels connect to microfluidic channels 40 in the microfluidic device 70.

Figure 22:
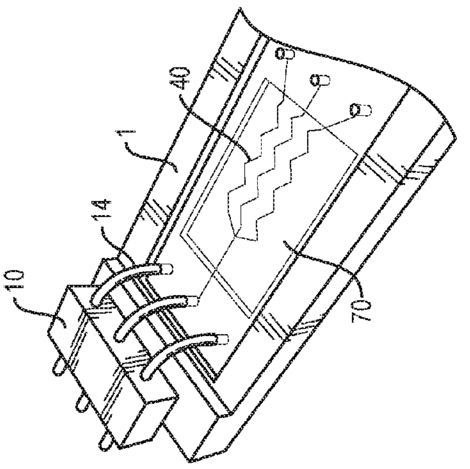
FIG. 22 is a perspective view of a pegged coupler that has been inserted into a support frame.

FIG. 22 is a perspective view of a pegged coupler 10 that has been inserted into a support frame 1.

Figure 23:
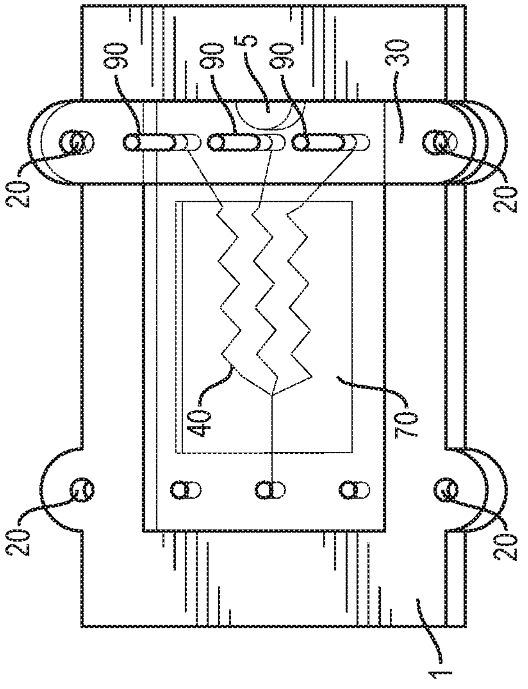
FIG. 23 is a perspective view of a bar coupler, resting loosely on a support frame.

FIG. 23 is a perspective view of a bar coupler 30, resting loosely on a support frame 1.

Figure 24:
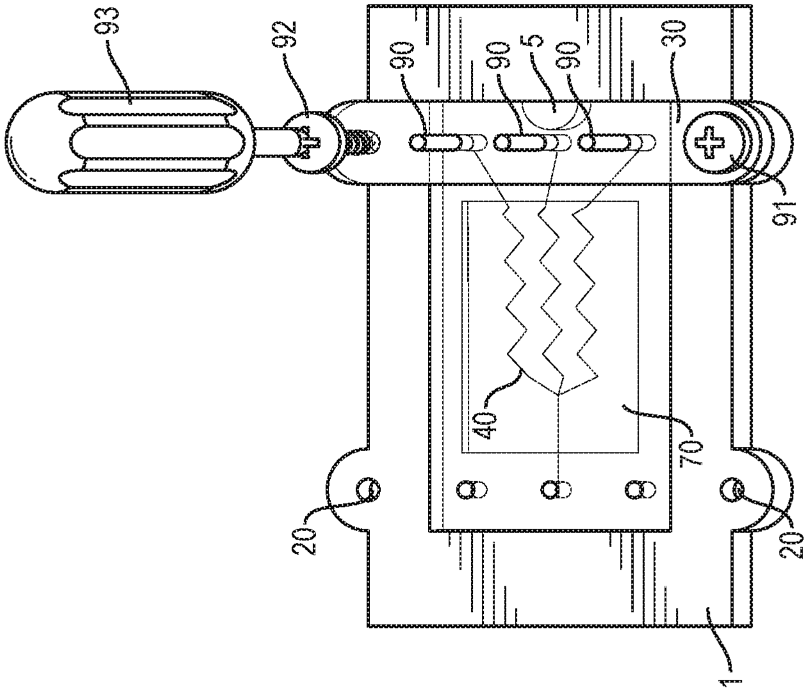
FIG. 24 shows a screw being tightened, to press a bar coupler against a support frame.

FIG. 24 shows a screw 92 being tightened by a screwdriver 93, to press a bar coupler 30 against a support frame 1. Screw 91 has already been tightened.

In FIGS. 23 and 24: (a) the support frame 1 is configured to be attached to two bar couplers; (b) a microfluidic device 70 is resting in, and supported by, a recessed region of the support frame 1; (c) the microfluidic device 70 includes microfluidic channels (e.g., 40); and (d) perfusion tubing 90 is inserted into channels in the bar coupler 30. Only a small portion of tubing 90 is shown in FIGS. 23 and 24.

Figure 25:
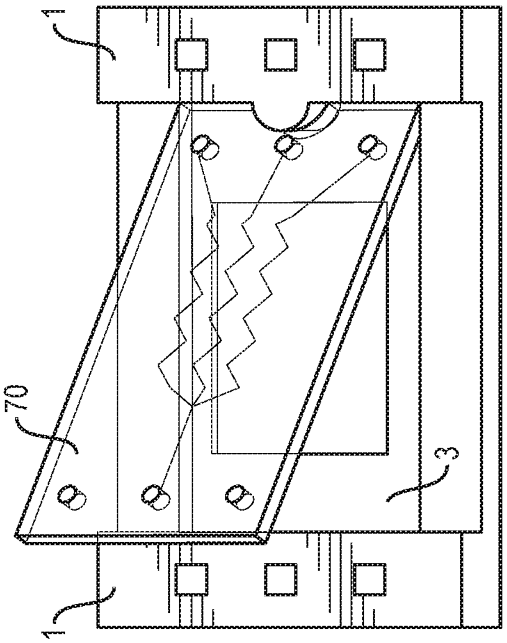
FIG. 25 is a perspective view of a microfluidic device (MFD) being inserted into a support frame.

FIG. 25 is a perspective view of a microfluidic device (MFD) 70 being inserted into a support frame 1.

Figure 26:
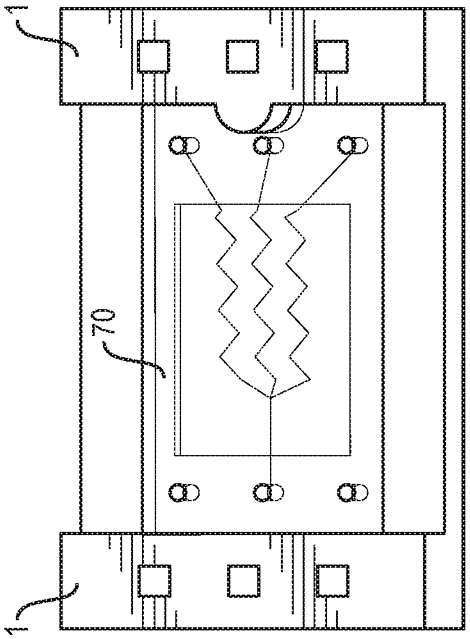
FIG. 26 is a perspective view of an MFD that has been inserted into a support frame.

FIG. 26 is a perspective view of a microfluidic device (MFD) 70 that has been inserted into a support frame 1.

Figure 27:
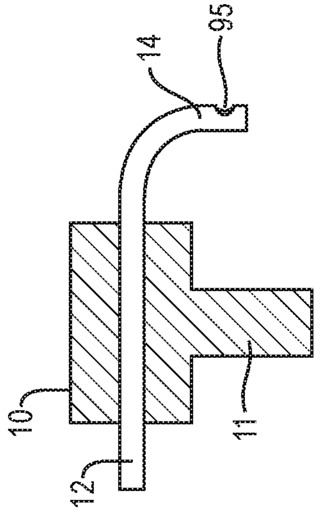
FIG. 27 shows a side hole in perfusion tubing of a pegged coupler.

FIG. 27 shows a side hole 95 in a terminal region 14 of perfusion tubing 12 of a pegged coupler 10.

Figure 28:
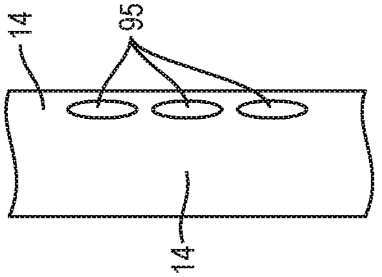
FIG. 28 shows multiple side holes in perfusion tubing.

FIG. 28 shows multiple side holes 95 in a terminal region 14 of perfusion tubing.

The side holes in FIGS. 27 and 28 are well-suited for connecting to different layers of microfluidic channels in a microfluidic device. For example, the terminal region 14 of perfusion tubing may be inserted into the microfluidic device, such that: (a) each side hole of the terminal region is positioned adjacent to an opening of a microfluidic channel in the device; (b) the tip of the terminal region 14 is positioned adjacent to an opening of a microfluidic channel in the device; and (c) the side holes and the tip connect to different layers of microfluidic channels in the device.

Figure 29:
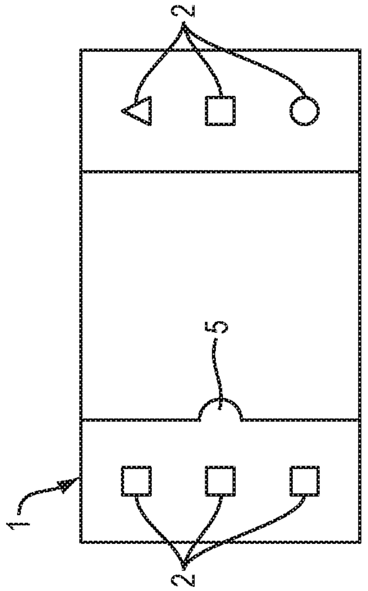
FIG. 29 shows a support frame. Guide holes in one side of the frame have a first combination of shapes and guide holes in another side of the frame have a different combination of shapes.

FIG. 29 shows a support frame 1 in which guide holes 2 in one side of frame 1 have a first combination of shapes (all square, on the left side) and the guide holes in another side of frame 1 have a different combination of shapes (triangular, square and circular, on the right side). As a result, the left and right sides of support frame 1 are configured to be attached to different types of pegged couplers. The left side of frame 1 is configured to be attached to pegged couplers that each have three square pegs. The right side of frame 1 is configured to be attached to pegged couplers that each have three pegs (one triangular, one square and one circular peg).

Figure 30:
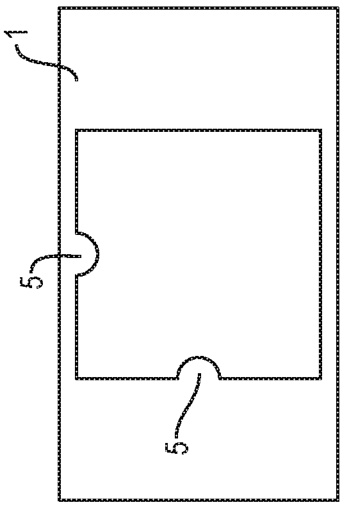
FIG. 30 shows a support frame with two protuberances for constraining orientation of a microfluidic device relative to the frame.

FIG. 30 is a top view of a support frame 1 with two protuberances 5 for constraining orientation of a microfluidic device relative to the frame. The effect of the two protuberances, taken together, is that, in order to insert a microfluidic device into the central (approximately square) region of support frame 1: (a) a specific, desired edge of the microfluidic device would be facing a specific, desired side of the support frame; and (b) a specific, desired side of the glass side in the microfluidic device would be facing up.

Thus, for example, the two protuberances may ensure that the right side of the microfluidic device is facing up and that the intake side of the microfluidic device is facing the intake perfusion tubes.

If support frame 1 has only one protuberance (as in FIGS. 1, 5, 10, 11, 23-26, 29, 31), instead of two protuberances, then in order to insert a microfluidic device into the central (approximately square) region of support frame 1, a specific, desired edge of the microfluidic device would be facing a specific, desired side of the support frame, but the microfluidic device could be flipped over, such that either side of the glass slide of the microfluidic device is facing up.

In FIG. 30, frame 1 is configured to support a microfluidic device that is inserted into the central (approximately square-shaped) recessed region of frame 1. The microfluidic device (not shown in FIG. 30) has two notches that match the two protuberances. When the microfluidic device is inserted into the central (approximately square-shaped) recessed region of frame 1, each protuberance 5 of frame 1 is inserted into a matching notch of the microfluidic device.

Figure 33:
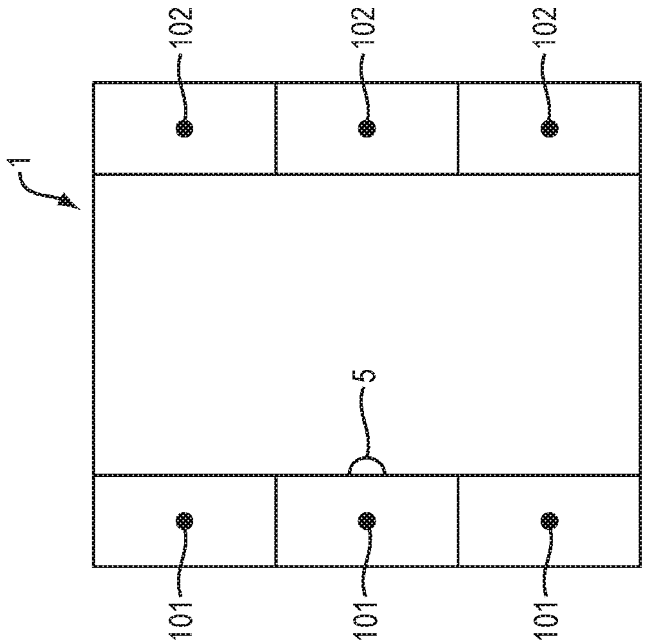
FIGS. 31, 32, and 33 show an example of parametric scaling.
Figure 31:
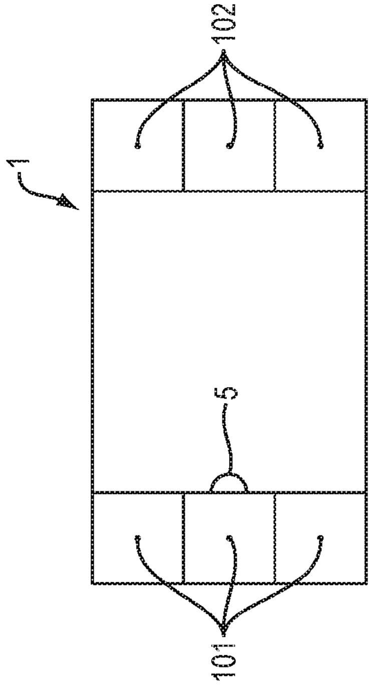
Figure 32:
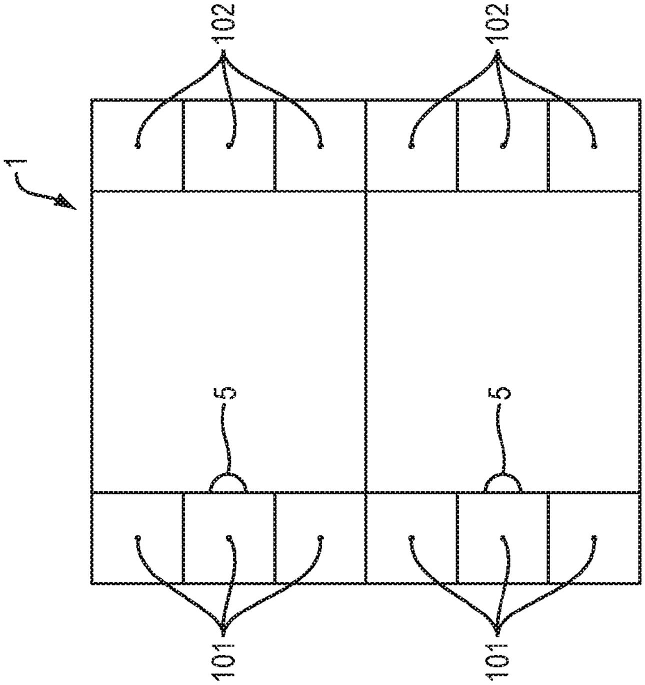

FIGS. 31, 32, and 33 show an example of parametric scaling.

FIG. 31 shows an original "starting point" design in which (a) a support frame has width W, length L, and one protuberance 5, and (b) Nin=Nout=3. Thus, in FIG. 31, there are three inlets 101 and three outlets 102.

FIG. 32 shows results obtained if both W and N are scaled by a factor of 2 In FIG. 31, there are six inlets 101 and six outlets 102.

FIG. 33 shows results obtained if the width W is scaled by a factor 2, but Nin and Nout remain unchanged. In FIG. 31, there are three inlets 101 and three outlets 102. However, each side of the microfluidic device is twice as long as the corresponding side in FIG. 31.

Computers

In exemplary implementations of this invention, one or more electronic computers are programmed and specially adapted: (1) to control the operation of, or interface with, hardware components of a graphical user interface for parametric scaling; (2) to perform any other calculation, computation, program, algorithm, computer function or computer task described or implied above; (3) to receive signals indicative of human input; (4) to output signals for controlling transducers for outputting information in human perceivable format; and (5) to process data, to perform computations, to execute any algorithm or software, and to control the read or write of data to and from memory devices (items 1 to 5 of this sentence being "Computer Tasks"). The one or more computers may be in any position or positions within or outside of the system. For example, in some cases (a) at least one computer is housed in or together with other components of the system and (b) at least one computer is remote from other components of the system. The one or more computers are connected to each other or to other components in the system either: (a) wirelessly, (b) by wired connection, or (c) by a combination of wired and wireless links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, computer function or computer task described or implied above. For example, in some cases, instructions encoded in a tangible, non-transitory, computer-accessible medium comprise instructions for a computer to perform the Computer Tasks.

Definitions:

The terms "a" and "an", when modifying a noun, do not imply that only one of the noun exists.

To compute "based on" specified data means to perform a computation that takes the specified data as an input.

"Channel" means a physical structure for guiding the flow of fluid, liquid or gas, such that the fluid, liquid or gas flows in or through the structure. A non-limiting example of a "channel" is a tube.

To say that an object "contains" channels does not imply that the channels lack any opening to a region outside the object.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Coupler" means an integral structure that includes one or more tubes and that is attachable to at least one other structure.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Fluid" means a gas or a liquid.

The term "for instance" means for example.

"Herein" means in this document, including text, specification, claims, abstract, and drawings.

The term "hole" means a hole, cavity, gap, opening or orifice.

The terms "horizontal" and "vertical" shall be construed broadly. For example, in some cases, the terms "horizontal" and "vertical" refer to two arbitrarily chosen coordinate axes in a Euclidian two dimensional space, regardless of whether the "vertical" axis is aligned with the orientation of the local gravitational field. For example, in some cases, a "vertical" axis is oriented along a local surface normal of a physical object, regardless of the orientation of the local gravitational field.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

A "microfluidic device " or "MFD" means a device containing multiple channels that together have a total inner volume, within the microfluidic device, that is less than or equal to one hundred milliliters.

A "microfluidic cartridge" or "MFD cartridge" means a support structure, one or more couplers, and a microfluidic device, which are assembled such that the support structure, one or more couplers, and the microfluidic device are fixed in position relative to each other.

The term "or" is inclusive, not exclusive. For example, A or B is true if A is true, or B is true, or both A or B are true. Also, for example, a calculation of A or B means a calculation of A, or a calculation of B, or a calculation of A and B.

A first X "out of" multiple Xs means a first X, which first X is a member of the set of multiple Xs.

A parenthesis is simply to make text easier to read, by indicating a grouping of words. A parenthesis does not mean that the parenthetical material is optional or may be ignored.

"Peg" means a protuberance.

Non-limiting examples of a "recessed" region include an indented region, a concave region, and a cavity that has an opening.

"Some" means one or more.

To say that an object is "substantially transparent" means at least a portion of light incident on the object passes through the object.

The term "such as" means for example.

To say that a machine-readable medium is "transitory" means that the medium is a transitory signal, such as an electromagnetic wave.

An "x, y, z position" means the coordinates of a point in a Cartesian coordinate system with three coordinate axes, which three axes are an x-axis, y-axis and z-axis.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, Applicant is acting as Applicant's own lexicographer.

Variations

This invention may be implemented in many different ways. Here are some non-limiting examples:

In some implementations, this invention is a system comprising: (a) two or more couplers; (b) a support structure; and (c) a microfluidic device; wherein (i) the support structure includes a recessed region, which recessed region is configured to support, and to constrain movement of, the microfluidic device when the microfluidic device is located in the recessed region, (ii) the microfluidic device includes one or more channels, (iii) each of the couplers includes one or more tubes, and (iv) each respective coupler is configured such that, when the respective coupler and support structure are attached to each other and the microfluidic device is located in the recessed region (A) the positions of the support structure, coupler, and microfluidic device are fixed relative to each other, and (B) at least one hole in at least one tube in each respective coupler opens into a channel of the microfluidic device. In some cases, each respective coupler is configured to be attached to the support structure by inserting a peg of the respective coupler into a hole in the support structure. In some cases, each respective coupler is configured to be attached to the support structure by screwing a screw into holes in the support structure and the respective coupler. In some cases, in each respective coupler: (a) the one or more tubes are metallic; and (b) the remainder of the respective coupler is not metallic. In some cases: (a) the support structure and the microfluidic device comprise a pair, the support structure and the microfluidic device being the two members of the pair; (b) a first member of the pair has a first protuberance on a first side of the first member; (c) a second member of the pair has a first indentation on a first side of the second member; and (d) the support structure and the microfluidic device are configured such that, when the microfluidic device is positioned in the recessed region of the support structure, the first protuberance fits into the first indentation. In some cases: (a) the first member of the pair has a second protuberance on a second side of the first member; (b) the second member of the pair has a second indentation on a second side of the second member; and (c) the support structure and the microfluidic device are configured such that, when the microfluidic device is positioned in the recessed region of the support structure, the second protuberance fits into the second indentation. In some cases: (a) the microfluidic device is substantially transparent; and (b) the support structure includes an opening, such that when the microfluidic device is positioned in the recessed region of the support structure and illuminated by light that strikes the opening, a portion of the light passes through the opening and the microfluidic device. In some cases, the microfluidic device has channels arranged in multiple layers, such that for each respective layer: (a) a set of one or more channels is positioned such that at least a portion of each channel in the set is located in the respective layer and is oriented parallel to the respective layer; and (b) at least one hole in a tube in a coupler opens into at least one channel that is a member of the set. In some cases, at least one specific tube in a specific coupler has multiple holes in a wall of the specific tube and is configured such that, when the specific coupler is attached to the support structure and the microfluidic device is located in the recessed region of the support structure: (a) a first hole opens into a channel in a first layer; and (b) a second hole opens into a channel in a second layer. In some cases, at least one coupler includes a first electrically conductive component and the microfluidic device includes a second electrically conductive component, such that, when the specific coupler is attached to the support structure and the microfluidic device is located in the recessed region of the support structure, the first and second electrically conductive components together form part of an electrical circuit. In some cases: (a) the support structure and the couplers are each a separate component; and (b) each of the couplers is configured to be attached to, and separated from, the support structure without damage. Each of the cases described above in this paragraph is an example of the system described in the first sentence of this paragraph, and is also an example of an embodiment of this invention that may be combined with other embodiments of this invention.

In some implementations, this invention is a system comprising: (a) two or more couplers; and (b) a support structure; wherein (i) the support structure includes a recessed region, which recessed region is configured to support, and to constrain movement of, a microfluidic device when the microfluidic device is located in the recessed region, which microfluidic device includes one or more channels, (ii) each of the couplers includes one or more tubes, and (iii) each respective coupler is configured such that, when the respective coupler and support structure are attached to each other and the microfluidic device is located in the recessed region (A) the positions of the support structure, coupler, and microfluidic device are fixed relative to each other, and (B) at least one hole in at least one tube in each respective coupler opens into a channel of the microfluidic device. The system described in the first sentence of this paragraph is an example of an embodiment of this invention that may be combined with other embodiments of this invention.

In some implementations, this invention is a method comprising: (a) attaching two or more couplers to a support structure; and (b) positioning a microfluidic device in a recessed region of the support structure; wherein (i) the recessed region supports, and constrains movement of, the microfluidic device when the microfluidic device is located in the recessed region, (ii) the microfluidic device includes one or more channels, (iii) each of the couplers includes one or more tubes, and (iv) when the respective coupler and support structure are attached to each other and the microfluidic device is located in the recessed region (A) the positions of the support structure, coupler, and microfluidic device are fixed relative to each other, and (B) at least one hole in at least one tube in each respective coupler opens into a channel of the microfluidic device. In some cases, each respective coupler is attached to the support structure by inserting a peg of the respective coupler into a hole in the support structure. In some cases, each respective coupler is attached to the support structure by screwing a screw into holes in the support structure and the respective coupler. In some cases: (a) the support structure and the microfluidic device comprise a pair, the support structure and the microfluidic device being the two members of the pair; (b) a first member of the pair has a first protuberance on a first side of the first member; (c) a second member of the pair has a first indentation on a first side of the second member; and (d) when the microfluidic device is positioned in the recessed region of the support structure, the first protuberance fits into the first indentation. In some cases: (a) the microfluidic device is substantially transparent; (b) the support structure includes an opening; and (c) the method includes illuminating the opening, such that light passes through the opening and the microfluidic device. In some cases, the microfluidic device has channels arranged in multiple layers, such that for each respective layer, out of the multiple layers: (a) a set of one or more channels is positioned such that at least a portion of each channel in the set is located in the respective layer and is oriented parallel to the respective layer; and (b) at least one hole in a tube in a coupler opens into at least one channel that is a member of the set. In some cases, at least one coupler includes a first electrically conductive component and the microfluidic device includes a second electrically conductive component, such that, when the specific coupler is attached to the support structure and the microfluidic device is located in the recessed region of the support structure, the first and second electrically conductive components together form part of an electrical circuit. In some cases: (a) the support structure and the couplers are each a separate component; and (b) each of the couplers is attached to, and then separated from, the support structure without damage. Each of the cases described above in this paragraph is an example of the method described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. A system comprising:

(a) two or more couplers;

(b) a support structure; and (c) a microfluidic device;

wherein (i) the support structure includes a recessed region, which recessed region is configured to support, and to constrain movement of, the microfluidic device when the microfluidic device is located in the recessed region, (ii) the microfluidic device includes one or more channels, (iii) each of the couplers includes one or more tubes, and (iv) each respective coupler is configured such that, when the respective coupler and support structure are attached to each other and the microfluidic device is located in the recessed region (A) the positions of the support structure, coupler, and microfluidic device are fixed relative to each other, and (B) at least one hole in at least one tube in each respective coupler opens into a channel of the microfluidic device.

2. The system of claim 1, wherein each respective coupler is configured to be attached to the support structure by inserting a peg of the respective coupler into a hole in the support structure.

3. The system of claim 1, wherein each respective coupler is configured to be attached to the support structure by screwing a screw into holes in the support structure and the respective coupler.

4. The system of claim 1, wherein, in each respective coupler:

(a) the one or more tubes are metallic; and (b) the remainder of the respective coupler is not metallic.

5. The system of claim 1, wherein:

(a) the support structure and the microfluidic device comprise a pair, the support structure and the microfluidic device being the two members of the pair;

(b) a first member of the pair has a first protuberance on a first side of the first member;

(c) a second member of the pair has a first indentation on a first side of the second member; and (d) the support structure and the microfluidic device are configured such that, when the microfluidic device is positioned in the recessed region of the support structure, the first protuberance fits into the first indentation.

6. The system of claim 5, wherein:

(a) the first member of the pair has a second protuberance on a second side of the first member;

(b) the second member of the pair has a second indentation on a second side of the second member; and (c) the support structure and the microfluidic device are configured such that, when the microfluidic device is positioned in the recessed region of the support structure, the second protuberance fits into the second indentation.

7. The system of claim 1, wherein:

(a) the microfluidic device is substantially transparent; and (b) the support structure includes an opening, such that when the microfluidic device is positioned in the recessed region of the support structure and illuminated by light that strikes the opening, a portion of the light passes through the opening and the microfluidic device.

8. The system of claim 1, wherein the microfluidic device has channels arranged in multiple layers, such that for each respective layer:

(a) a set of one or more channels is positioned such that at least a portion of each channel in the set is located in the respective layer and is oriented parallel to the respective layer; and (b) at least one hole in a tube in a coupler opens into at least one channel that is a member of the set.

9. The system of claim 8, wherein at least one specific tube in a specific coupler has multiple holes in a wall of the specific tube and is configured such that, when the specific coupler is attached to the support structure and the microfluidic device is located in the recessed region of the support structure:

(a) a first hole opens into a channel in a first layer; and (b) a second hole opens into a channel in a second layer.

10. The system of claim 1, wherein at least one coupler includes a first electrically conductive component and the microfluidic device includes a second electrically conductive component, such that, when the specific coupler is attached to the support structure and the microfluidic device is located in the recessed region of the support structure, the first and second electrically conductive components together form part of an electrical circuit.

11. The system of claim 1, wherein:
(a) the support structure and the couplers are each a separate component; and
(b) each of the couplers is configured to be attached to, and separated from, the support structure without damage.

12. A system comprising:
(a) two or more couplers; and
(b) a support structure;
wherein
(i) the support structure includes a recessed region, which recessed region is configured to support, and to constrain movement of, a microfluidic device when the microfluidic device is located in the recessed region, which microfluidic device includes one or more channels,
(ii) each of the couplers includes one or more tubes, and
(iii) each respective coupler is configured such that, when the respective coupler and support structure are attached to each other and the microfluidic device is located in the recessed region
(A) the positions of the support structure, coupler, and microfluidic device are fixed relative to each other, and
(B) at least one hole in at least one tube in each respective coupler opens into a channel of the microfluidic device.

13. A method comprising:
(a) attaching two or more couplers to a support structure; and
(b) positioning a microfluidic device in a recessed region of the support structure;
wherein
(i) the recessed region supports, and constrains movement of, the microfluidic device when the microfluidic device is located in the recessed region,
(ii) the microfluidic device includes one or more channels,
(iii) each of the couplers includes one or more tubes, and
(iv) when the respective coupler and support structure are attached to each other and the microfluidic device is located in the recessed region
(A) the positions of the support structure, coupler, and microfluidic device are fixed relative to each other, and
(B) at least one hole in at least one tube in each respective coupler opens into a channel of the microfluidic device.

14. The method of claim 13, wherein each respective coupler is attached to the support structure by inserting a peg of the respective coupler into a hole in the support structure.

15. The method of claim 13, wherein each respective coupler is attached to the support structure by screwing a screw into holes in the support structure and the respective coupler.

16. The method of claim 13, wherein:
(a) the support structure and the microfluidic device comprise a pair, the support structure and the microfluidic device being the two members of the pair;
(b) a first member of the pair has a first protuberance on a first side of the first member;
(c) a second member of the pair has a first indentation on a first side of the second member; and
(d) when the microfluidic device is positioned in the recessed region of the support structure, the first protuberance fits into the first indentation.

17. The method of claim 13, wherein:
(a) the microfluidic device is substantially transparent;
(b) the support structure includes an opening; and
(c) the method includes illuminating the opening, such that light passes through the opening and the microfluidic device.

18. The method of claim 13, wherein the microfluidic device has channels arranged in multiple layers, such that for each respective layer, out of the multiple layers:
(a) a set of one or more channels is positioned such that at least a portion of each channel in the set is located in the respective layer and is oriented parallel to the respective layer; and
(b) at least one hole in a tube in a coupler opens into at least one channel that is a member of the set.

19. The method of claim 13, wherein at least one coupler includes a first electrically conductive component and the microfluidic device includes a second electrically conductive component, such that, when the specific coupler is attached to the support structure and the microfluidic device is located in the recessed region of the support structure, the first and second electrically conductive components together form part of an electrical circuit.

20. The method of claim 13, wherein:
(a) the support structure and the couplers are each a separate component; and
(b) each of the couplers is attached to, and then separated from, the support structure without damage.

* * * * *